United States Patent
Coakley

[15] 3,678,951
[45] July 25, 1972

[54] METHOD AND APPARATUS FOR IMPROVED JET PIPE VALVE

[72] Inventor: James L. Coakley, Camarillo, Calif.
[73] Assignee: Abex Corporation, New York, N.Y.
[22] Filed: June 15, 1970
[21] Appl. No.: 46,244

[52] U.S. Cl. ........................................137/14, 137/83, 91/3
[51] Int. Cl. ................................F15b 5/00, G05d 16/00
[58] Field of Search ............137/83, 625.64, 625.61, 81.5; 91/3; 137/14

[56] References Cited

UNITED STATES PATENTS

| 2,913,535 | 11/1957 | Markey | 137/83 |
| 2,904,057 | 9/1959 | Callender | 137/83 |
| 2,247,301 | 6/1941 | Lesser | 91/3 |
| 3,442,284 | 5/1969 | Hurtle | 137/83 X |

Primary Examiner—Alan Cohan
Attorney—Wood, Herron & Evans

[57] ABSTRACT

A method and apparatus for increasing the load flow characteristic of a jet pipe valve. The practice of the method and the apparatus is operable to inject fluid under pressure into the two output load channels of the valve so as to amplify the rate of flow through the jet pipe output channels.

18 Claims, 4 Drawing Figures

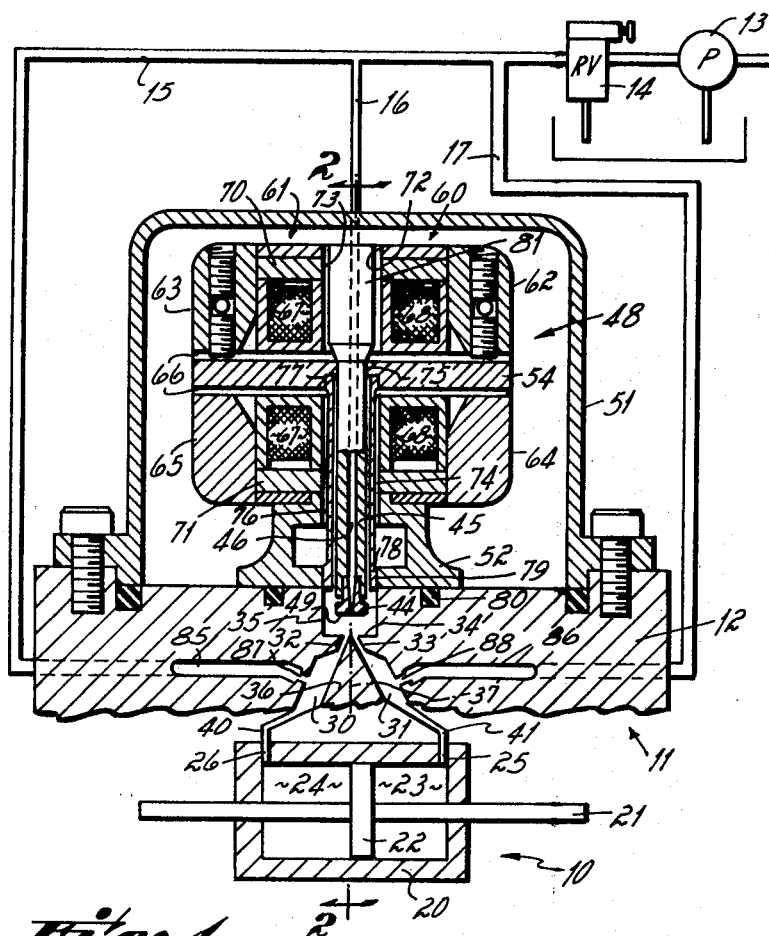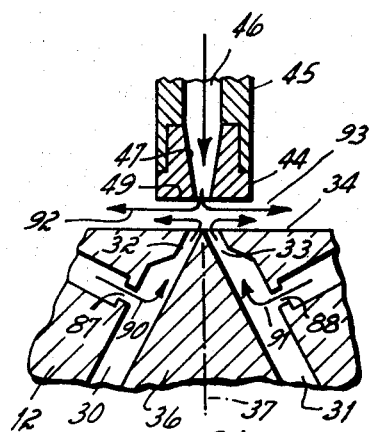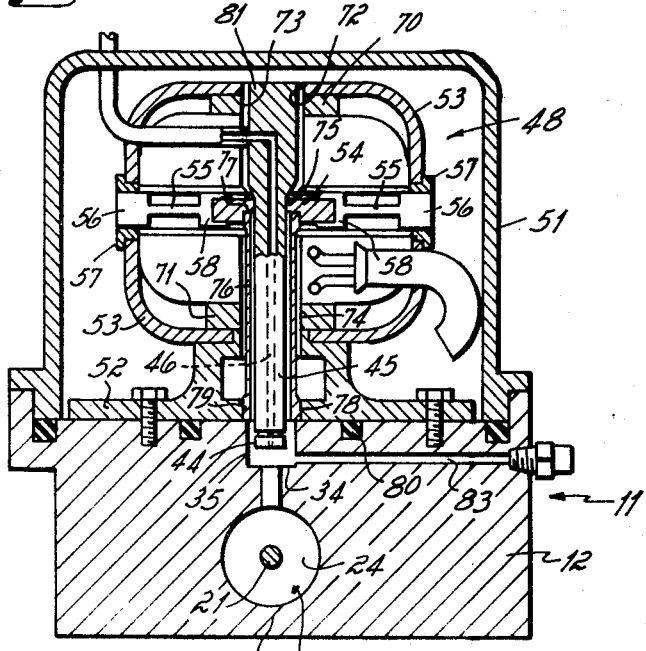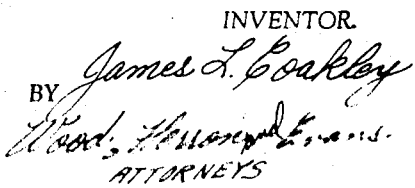

METHOD AND APPARATUS FOR IMPROVED JET PIPE VALVE

This invention relates to jet pipe valves of the type used for controlling a fluid function such as a direction of fluid flow or a rate of flow in a hydraulic system. In a preferred embodiment, it relates to an electro-hydraulic valve for controlling the displacement of a movable element such as a hydraulic motor in response to the magnitude and direction of electric current supplied to the valve.

Jet pipe valves of the general type with which the present invention is concerned may be employed for a number of purposes, for example to control the position of a valve spool or a piston or ram. In general, such valves are usually used to control a fluid function, for example the rate of flow of fluid, to effect a desired operation of hydraulic equipment with which the valve is used. Most commonly, such jet pipe valves are used in association with a torque motor, usually an electric torque motor, to control the displacement of the jet pipe so that the valve acts as an electro-hydraulic interface for a control system.

A jet pipe valve is a valve having a projector jet movable so as to direct a jet of fluid selectively into one or both of a pair of receptor ports. The ports are in turn hydraulically connected to a valve controlled piston or spool so that the establishment of a pressure differential between the receptor ports by the jet effects displacement of the piston or spool.

It has been a primary objective of this invention to increase the "load flow" capability or power output capability of a jet pipe valve without materially increasing the physical size or complexity or cost of the valve. Power output is determined by the pressure times the rate of flow in a valve. It has therefore been a primary objective of this invention to increase the potential power output from a given size jet pipe valve or unit of jet pipe hardware without increasing the size or complexity of the unit.

The most limiting factor in the determination of the energy output and flow from a given size jet pipe valve is the torque motor stroke. A particular torque motor can only stroke the projector jet a predetermined distance against the resistance of the springs which normally maintain the jet pipe in a centered position relative to the receptor ports. The torque motor must stroke the projector jet approximately plus or minus one-half the exit diameter of the bore in the projector jet to be effective. Consequently, the torque motor stroke limits the exit diameter of the bore in the projector jet and this diameter in turn limits the flow through the valve.

Expressed another way, it has been an objective of this invention to increase the output flow through the two receptor conduits or load channels of a jet pipe valve without increasing the exit diameter of the bore in the projector jet which controls fluid flow through the channels.

These objectives have been achieved and this invention is predicated upon the concept of injecting fluid from a source of hydraulic fluid under pressure into each of the load channels or receptor conduits downstream of the receptor ports. If there is no load flow in the load channels because of the projector jet being centered over the two receptor ports, then the injected flow goes out equally through the receptor ports. If on the other hand, the projector jet is displaced over one of the receptor ports, then some flow from the projector jet is added to the injected flow in that load channel and is directed to the load which may be a fluid ram or motor. Simultaneously, flow equivalent to the injected flow plus the projector jet flow in the load channel flows out of the other channel through the other receptor port. The injected flow thus has the effect of increasing the load flow or the power output substantially over that which is achieved without the injected flow as a result of the projector jet flow only.

The advantage of this invention is that it enables the power output of a jet pipe valve to be substantially increased without the addition of any appreciable amount of hardware. Specifically, it only requires connecting the source of fluid pressure of the valve to the orifices through which fluid is injected into the load channels downstream of the receptor ports. This results in a much greater amplification between the torque motor signal and the power output of fluid flow in the load channels.

Jet valves may have either one or two valve stages, but most commonly jet pipe valves have heretofore had two stages such that an electrical input to the valve caused the jet pipe or primary stage to control fluid flow to a secondary stage valve. The secondary stage valve then controlled flow to a hydraulic piston or ram.

In many applications it is highly desirable to eliminate the second stage valve between the jet pipe valve and the hydraulic motor or ram being controlled. If the energy rate or power required to move the ram is relatively low the second stage has sometimes heretofore been eliminated. However, if higher level loads have been required, there has always been the necessity for a second stage valve to control fluid flow to and from the motor.

This invention, by increasing the load flow characteristic of a given size jet pipe valve, eliminates the necessity for a second stage valve in many applications by increasing the amplification possible between the power input of a given size valve and the hydraulic power output.

These and other objects and advantages of this invention will be more readily apparent from the description of the drawings in which:

FIG. 1 is a partially schematic cross-sectional view through an electro-hydraulic servo system incorporating the invention of this application;

FIG. 2 is a cross-sectional view taken on line 2—2 through the valve of FIG. 1.

FIG. 3 is an enlarged cross-sectional view of a portion of the servo valve of FIG. 1;

FIG. 4 is a view similar to FIG. 3 but illustrating the projector jet of the valve in an extreme leftwardmost position.

Referring first to FIG. 1, the electro-hydraulic motor and control system of this invention comprises generally a hydraulic motor 10 and an electro-hydraulic jet pipe control valve 11. This valve 11 includes a ported mounting block 12. Hydraulic fluid under pressure is supplied to the system from a hydraulic pump 13 through a relief valve 14 via conduits 15, 16 and 17. The pump 13 may be driven by any conventional motor as, for example, an electrical motor 18.

The motor 10 includes a cylinder block 20 within which a piston rod 21 is slidable. A piston 22 on the piston rod 21 separates the two chambers 23 and 24 at opposite ends of the cylinder block 20. The piston 22 is movable under hydraulic pressure supplied through ports 25 and 26 of the block 20 so as to effect movement of the piston rod 21.

Within the ported mounting block 12, there are two converging receptor conduits or bores 30 and 31 of identical construction. At their upper ends these converging bores 30 and 31 taper into small cylindrical ports 32 and 33. These two smaller diameter ports converge at an angle such that the two meet at the bottom 34 of a cylindrical bore 35 in the block 12. In other words, the ports 32 and 33 are positioned at an angle such that the peripheries of the two orifices, at the port mouths, are in close proximity. The ports thus define between them as viewed in cross section a cone-shaped section 36 in the block 12. The converging receptor conduits 30 and 31 are symmetrical about the center line 37 of the cone-shaped section 36.

The lower ends of the conduits 30 and 31 are in fluid communication with ports 26 and 25, respectively, of the cylinder block 20. The conduit 30 is connected to the chamber 24 at one end of the cylinder motor 10 via a conduit 40 and the port 26 while the other receptor bore 31 is connected to the chamber 23 at the opposite end of the motor 10 via a fluid line 41 and port 25.

A projector jet 44 of a jet pipe 45 protrudes into the bore 35 of port block 12 and is axially aligned so that its axis coincides with the axis 37 and is midway between the centers of the bores 32 and 33, as shown in FIG. 3. The jet pipe 45 is bored with a central bore 46 and counter bore at its lower end to receive the projector jet 44 which has a downwardly tapered conical bore 47. The axis of the bore 47 bisects the angle between the center lines of the bores 32 and 33 with the adjacent ends of the bores 32 and 33 symmetrically positioned with respect to the axis of the conical bore 47 in the plane of the displacement of the axis of bore 47 as will be explained more fully hereinafter.

The jet pipe 45 is mounted for displacement in the plane including the axis of the bores 32 and 33 as illustrated in FIG. 3. It may be moved by any moving mechanism, either manual or inertial or by means of an electric motor such as 48. The jet pipe is supplied with fluid under pressure from the line 16 through the bore 46 which extends upwardly to the upper end of the jet pipe 45.

The configuration of the projector jet 44, as shown, has a flat planar end 49 which is perpendicular to the axis of the bore 46 and is in extent considerably greater than the mouth of the angular bores 32 and 33. The configuration thus has the property that any emitted fluid, particularly if the fluid be liquid of substantial mass, impinging upon the end of the conical portion 36 of the port block 12, will be reflected therefrom to impinge upon the lower end 49 of the projector jet 44 substantially symmetrically about the axis of the bore 47.

As mentioned hereinabove, the jet pipe 45 may be actuated by any means, either manually by providing a suitable handle at the upper end of the jet pipe or by an inertial element or as illustrated in the preferred embodiment of FIGS. 1 and 2, by an electric torque motor 48. The torque motor which has been illustrated in FIGS. 1 and 2 is in general similar to the electric torque motor illustrated in U.S. Pat. No. 3,017,864 issued Jan. 23, 1969 in the name of Raymond D. Atchley and assigned to the assignee of this application. In fact, the torque motor 48 of this application is identical to the torque motor of that patent except that the fluid input to the jet pipe 45 is through the conduit 16 which enters a housing 51 of the motor 48 through the top rather than through the base block 12. Because the two torque motors are identical, the one of this application will only be described generally.

The torque motor 48 is mounted upon the top of the mounting block 12 and rests upon a mounting base 52. This base 52 is bolted to the mounting block 12. The motor 48 generally comprises a strapped frame 53 which carries the armature 54 mounted on torsion members 55. One end of a shaft member 56 is rigidly fixed by brazing to a bushing 57 which is rigidly fixed into strap 53 by brazing, and the other end is formed as a fork 58 into which the armature 54 is rigidly fixed by brazing. At each end of the frame 53 is positioned a pole and magnet assembly 60, 61 composed of C-shaped magnets, the C-shaped magnets oriented with their north poles and south poles opposite each other. Each such assembly consists of pole pieces 62 and 63 at the north pole and pole pieces 64 and 65 at the south pole spaced from each other to produce a gap 66. The armature 54 is positioned symmetrically in each of said gaps to give four equal gaps, two at one end of the armature and two at the other end between the adjacent pole pieces. Interiorly of the frame 53 and between the magnet and pole piece assembly are positioned coils 67 and 68 which encompass the armature 54. Each of the coils are wound so as to be in bucking relation and inductively coupled with the armature 54. Interiorly of the frame 53 and abutting the pole pieces 62, 63 and 64, 65 one at the north pole and one at the south pole, are the magnetically conductive member 70 and 71.

The frame 53 is bored at 72 and the bars 70 and 71 are bored at 73 and 74 and the armature is bored at 75 to receive the jet pipe 45 which is positioned within the bores 72, 73, 74 and 75, and between the coils 67 and 68, pipe 45 being rigidly affixed to the armature 54 and sealed in the bores 75. A flexible pipe 76, axially aligned with the pipe 45, is rigidly connected to and sealed in the armature 54 in a counterbore 77. The mounting base 52 of the torque motor is bored at 78 to permit the passage of the tube 76 and the pipe 45. The tube 76 is rigidly connected and sealed at its end 79 to the mounting base 52. The base 52 is connected to the top of the block 12 and sealed by means of O-ring 80 as shown.

The upper portion 81 of the pipe 45 is of larger diameter so that the pipe is weight balanced about the center of rotation of the armature 54 on the torsion members 55. The pipe 45 communicates, as described above, with the counterbore 35, in block 12, and is connected directly to the conduit 16 through the top of the housing 51. The fluid discharge is provided by a bore 83 connected to the counterbore 35 (see FIG. 2).

The electro-hydraulic valve system heretofore described, except for the fluid conduits 15 and 17 is generally similar in both structure and function to the valve and motor system described in the above identified U.S. Pat. No. 3,017,864. The invention of this application, though, functions to increase the power output derivable from a jet pipe valve of the type described in the above identified referenced patent. To that end, the valve of this application departs from the valve of the above identified referenced patent in that it includes the fluid conduits 15 and 17 as well as conduits 85 and 86 in the port block. The conduit 85 is connected to the fluid pressure line 15 while the conduit 86 is connected to the fluid pressure line 17. Conduit 85 enters into and intersects the receptor conduit 30 of the port plate via a smaller diameter orifice or port 87. Similarly, the conduit 86 intersects the receptor conduit 31 via an interconnecting orifice or port 88. The two orifices 87 and 88 intersect the conduits 30 and 31, respectively at a 90° angle so that the two are perpendicular to their respective intersecting conduits of the port plate 12.

Assuming that no signal is impressed on the coils 67 and 68 of the torque motor 48 or that the signal is such that equal and opposing flux is generated in the torque motor by coils 67 and 68 so that the armature is in the null position and centered in the gaps 66 between the pole pieces 62-65, fluid under pressure entering through fluid line 16 passes through the jet pipe 45 and bore 47 and exits from the projector jet. In this position of the projector jet the bores 32 and 33 receive equal amounts of fluid from the jet 44. Simultaneously, fluid is entering each of the load channels 30 and 31 from the conduits 85 and 86 downstream of the receptor ports 32 and 33. The flow through the conduits 85 and 86 is equal and balanced in both pressure and rate of flow. It therefore does not effect the displacement of the motor piston 22. Since the pressure in the chambers 23 and 24 is equal, the flow through the ports 85 and 86 thus exits through the ports 32 and 33 into the bore 35 where it joins the flow from the projector jet 44 and passes into the discharge pipe 83. The fluid pressure at the ports 32 and 33 is equal and thus exerts equal pressure against the opposite sides of the piston 22. Since these sides have equal areas, the pressure being exerted against them through the ports 25 and 26 is equal so that the piston is not displaced from its position, irrespective of the fact that there is fluid flow in the fluid conduits or load channels 30 and 31 entering via the conduits 85 and 86 and exiting via the ports 32 and 33. This flow is depicted by the arrows 90, 91 in FIG. 3. The simultaneous balanced flow from the projector jet 44 is depicted by the arrows 92 and 93 in this figure.

Should a signal be impressed to coils 67 and 68 so as to imbalance the flux induced into these coils to cause a deflection of the armature 54 in gaps 66, the pipe 45 is rotated about an axis of rotation passing centrally through armature 54 and through a line along the axis of the torsion members 55. This imposes a twist on the flexible pipe 76 and a displacement of the end of the projector jet 44 to the left. To be effective the torque motor is generally capable of stroking the projector jet 44 approximately plus and minus one-half the lower or exit diameter of bore 47. When stroked to the full extent, i.e., one-half the exit diameter of bore 47, the full flow of the projector jet is directed into one or the other of the two receptor ports 32 and 33. As depicted in FIG. 4, the projector jet is fully displaced so as to direct its full flow into the receptor port 32. In this position, more fluid enters bore 32 than enters bore 33 and the pressure in fluid chamber 24 becomes greater than the pressure in chamber 23 with the result that the piston 22 is displaced to the right, as viewed in FIG. 1. In this position of the projector jet, flow from the projector jet 44 adds to the injected flow into the load channel from the conduit 85 and is directed through the port 26 into the chamber 24. It is this combined flow from conduit 85 and jet 44 which goes to the load and is referred to as load flow effective to do work. Simultaneously with load flow into the chamber 24 of the hydraulic motor, flow equivalent to this load flow flows from the chamber 23 via the receptor channel 31 into the bore 35. This equivalent flow in receptor channel 31 is depicted by the arrow 98 in FIG. 4. The load flow in channel 30 is depicted in this figure by the arrows 96 and 97.

So long as the pressure is maintained greater in chamber 24 than in chamber 23, the piston 22 of the motor will travel to the right until the right side of the piston abuts the end wall of the cylinder 20. As long as the signal maintains the deflection of the jet pipe to exert this degree of pressure, the piston will remain in its attained position and will do so even if the signal is interrupted, whereupon the stress in the tube 76 and in the flexure 55 will act as a restoring force to bring the pipe 45 back to center. When the pipe 45 is back in a centered position, the pressures in the chambers 23 and 24 again become equal and the piston remains in the position in which it had been placed.

The projector jet 44 and the receptor ports 32 and 33 described above are essentially a two-position valve, which valve routes fluid in either of two directions in response to an electrical command. The valve acts as an electro-hydraulic amplifier in the sense that a small electric power input may be made to control a high power level fluid output. The power level of the output is increased by the injected flow into the load channels 30 and 31 via the conduits 85 and 86. This injected flow increases the effective load flow and thereby increases the power amplification of the valve. Consequently, a given size valve with the addition of the injected flow may have a much higher amplification or otherwise expressed a higher power output rating.

While I have described the valve of this application as a two-position reversible fluid valve, it will readily be apparent that it may also, if desired, control the rate at which the piston 22 is movable in either direction. The valve is also applicable to servo mechanisms. When used as a servo valve, a position or force feedback is interconnected between the piston 22 or piston rod 21 and the jet pipe 45. A complete description of this type of servo valve feedback arrangement may be found in U.S. Pat. No. 3,017,864. For purposes of completing this disclosure to show that type of operation the disclosure of U.S. Pat. No. 3,017,864 is hereby incorporated by reference.

While I have described only a single preferred embodiment of my invention, those persons skilled in the fluid control arts will readily appreciate other modifications of the invention which may be made without departing from the spirit of this invention. Therefore, I do not intend to be limited except by the scope of the appended claims.

Having described my invention, I claim:

1. The method of increasing the load flow capability of a jet pipe valve, which valve comprises a pair of stationary receptor ports entering into a pair of receptor conduits, which conduits are connected to an element to be controlled by fluid flow through said conduits and a projector jet in fluid communication with said stationary ports and selectively movable so as to direct greater or lesser flows of fluid into one or the other of said stationary receptor ports, which method comprises injecting additional fluid under pressure as a continuously flowing fluid stream into said stationary conduits downstream of said receptor ports so as to increase the fluid flow in said conduits, said additional fluid being injected at substantially equal flow rates into said conduits throughout all positions of said movable projector jet.

2. The method of claim 1 in which said additional fluid is injected under equal pressure into said receptor conduits.

3. The method of claim 1 in which said additional fluid is injected into said receptor conduits at equal pressure and at relatively constant and equal flow rates.

4. The method of increasing the load flow capability of a jet pipe valve, which valve comprises a pair of stationary receptor ports entering into a pair of receptor conduits, which conduits are connected to an element to be controlled by fluid flow through said conduits and a projector jet in fluid communication with said stationary ports and selectively movable so as to direct greater or lesser flow of fluid into one or the outer other of said stationary receptor ports, the receptor conduits being angularly disposed at an acute angle to each other and said movable jet being biased to a position with its axis bisecting the angle of the angularly disposed conduits, which method comprises injecting additional fluid under pressure as a continuously flowing fluid stream into said stationary conduits downstream of said receptor ports so as to increase the fluid flow in said conduits, said additional fluid being injected into said conduits at substantially equal flow rates throughout all positions of said movable projector jet.

5. The method of claim 4 in which said additional fluid is injected into said receptor conduits at equal pressure.

6. The method of claim 4 in which said additional fluid is injected into said receptor conduits at relatively constant and equal flow rates and pressures.

7. A jet pipe valve comprising a pair of stationary receptor ports entering into a pair of receptor conduits, which conduits are adapted to be connected to an element to be controlled by fluid flow through said conduits, a projector jet in fluid communication with said stationary ports and selectively movable so as to direct greater or lesser flows of fluid into one or the other of said stationary receptor ports, the improvement which comprises continuous flow means for injecting additional fluid under pressure as a continuous flow stream into said stationary conduits downstream of said receptor ports so as to increase the fluid flow in said conduits, said continuous flow means being operable to maintain said flow of additional fluid into said conduits at substantially equal flow rates throughout all positions of said movable projector jet.

8. The valve of claim 7 in which said continuous flow means is operable to inject additional fluid into said receptor conduits under equal pressure.

9. The valve of claim 7 in which said continuous flow means is operable to inject additional fluid into said receptor conduits at relatively constant flow rates.

10. The valve of claim 7 which further includes a torque motor to effect movement of said projector jet.

11. A jet pipe valve comprising a pair of stationary receptor ports entering into a pair of receptor conduits, which conduits are adapted to be connected to an element to be controlled by fluid flow through said conduits, a projector jet in fluid communication with said stationary ports and selectively movable so as to direct greater or lesser flows of fluid into one or the other of said stationary receptor ports, the receptor conduits being angularly disposed at an acute angle to each other and said movable jet being biased to a position in which its axis bisects the angle of the angularly disposed conduits, the improvement which comprises continuous flow means for injecting fluid under pressure as a continuous flow stream into said stationary conduits downstream of said receptor ports so as to increase the fluid flow in said conduits, said continuous flow means being operable to maintain said flow of additional fluid into said conduits at substantially equal flow rates throughout all positions of said movable projector jet.

12. The valve of claim 11 in which said continuous flow means is operable to inject additional fluid into said receptor conduits at equal pressures.

13. The valve of claim 11 in which said continuous flow means is operable to inject additional fluid at equal pressure into said receptor conduits and at relatively constant flow rates.

14. The valve of claim 11 which further includes a torque motor to effect movement of said projector jet.

15. A jet pipe valve comprising a pair of stationary receptor ports entering into a pair of receptor conduits, which conduits are adapted to be connected to an element to be controlled by fluid flow through said conduits, a projector jet in fluid communication with said stationary ports, a torque motor for selectively moving said projector jet so as to direct greater or lesser flows of fluid into one or the other of said stationary receptor ports, the improvement which comprises continuous flow means for injecting fluid under pressure as a continuous flow stream into said stationary conduits downstream of said receptor ports so as to increase the fluid flow in said conduits, said continuous flow means being operable to maintain said flow of additional fluid into said conduits at substantially equal flow rates throughout all positions of said movable projector jet.

16. The valve of claim 15 in which said torque motor is actuated and controlled by the flow of electrical current.

17. The valve of claim 16 in which the continuous flow means is operable to inject additional fluid into said receptor conduits under equal pressure.

18. The valve of claim 16 in which the continuous flow means is operable to inject fluid into said receptor conduits at relatively constant flow rates.

* * * * *